United States Patent [19]

Chaplin et al.

[11] Patent Number: 4,951,892
[45] Date of Patent: Aug. 28, 1990

[54] SERVER SYSTEM FOR RUBBERIZED SHEETS

[75] Inventors: Gregory D. Chaplin, Chippewa; John D. Rensel, Tallmadge; Joseph C. Norka, Akron, all of Ohio

[73] Assignee: Bridgestone/Firestone, Inc., Akron, Ohio

[21] Appl. No.: 292,031

[22] Filed: Dec. 30, 1988

[51] Int. Cl.⁵ .................... B65H 18/16; B65H 23/032
[52] U.S. Cl. .............................. 242/57.1; 242/67.3 R; 242/65; 242/58.6; 156/395; 156/406
[58] Field of Search ...................... 242/57.1, 58.6, 59, 242/67.1 R, 67.3 R, 67.2, 75.1, 79; 156/395, 405.1, 406, 406.4, 584

[56] References Cited

U.S. PATENT DOCUMENTS

| | | | |
|---|---|---|---|
| 1,859,330 | 5/1932 | Desautels | 156/395 |
| 1,959,418 | 8/1932 | Fourness | |
| 2,480,704 | 8/1949 | Breth | |
| 2,755,028 | 7/1956 | Noall | |
| 3,232,547 | 2/1966 | Thiede et al. | 242/57.1 |
| 3,293,101 | 4/1963 | Cantarutti | |
| 3,623,677 | 11/1969 | Appleby | |
| 4,120,717 | 10/1978 | Rost | 156/395 |
| 4,170,504 | 10/1979 | Riggs | 242/57.1 X |
| 4,261,786 | 4/1981 | Martin et al. | 156/406 |
| 4,384,686 | 5/1983 | Wiley et al. | 242/57.1 |
| 4,457,802 | 7/1984 | Yanagihara | |
| 4,540,131 | 10/1985 | Ishii | |
| 4,545,718 | 10/1985 | Marshall | 242/57.1 X |
| 4,676,496 | 6/1987 | Honegger | 242/59 X |
| 4,768,768 | 9/1988 | Reist | 242/59 X |
| 4,775,111 | 10/1988 | Kalin | 242/59 |

FOREIGN PATENT DOCUMENTS 897574 4/1980 U.S.S.R.

Primary Examiner—John M. Jillions
Attorney, Agent, or Firm—Ronald Brietkrenz

[57] ABSTRACT

A system and apparatus for accurately delivering rubberized sheets from a supply roll of stock material containing an intervening liner to an assembly station for subsequent assembling into an air spring or similar article of manufacture by eliminating the heretofore formation of a "free loop" therein. The supply roll and a liner take-up reel are rotatably mounted on a carriage transversely movable with respect to the longitudinal motion of the stock material. A hugger device has a plurality of timing belts which frictionally engage the liner at the take-up reel and winds the liner onto the reel at a constant linear speed regardless of the diameter of the reel and collected liner to move the rubberized sheet at a controlled rate toward the assembly station. The motion profile of the timing belts is controlled by a servo drive motor and the belts engage an arcuate portion of the circumference of the take-up reel to provide positive frictional drive engagement therewith. The carriage is moved along a pair of tracks by a ballscrew mechanism for bringing the cartridges of stock material and take-up reel into position with the timing belts and assembly station. An optical edge detection device and encoder, in conjunction with a motion controller, accurately control and regulate the system.

28 Claims, 8 Drawing Sheets

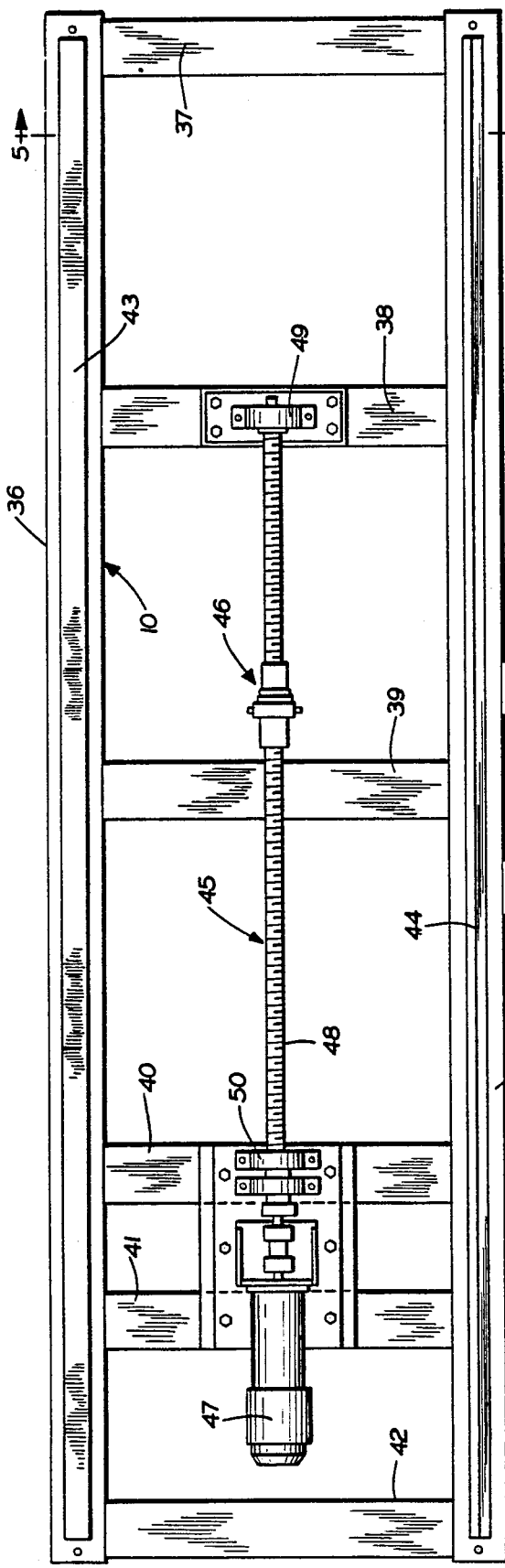
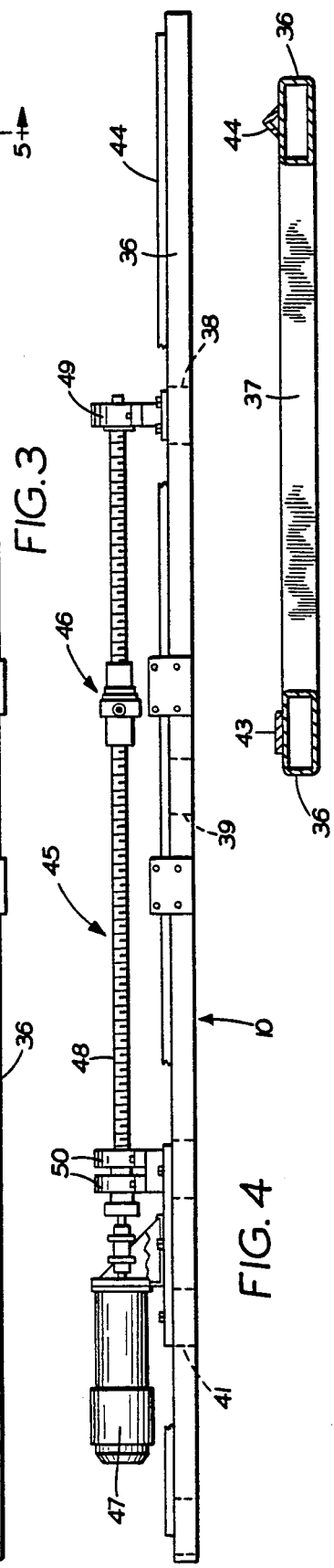
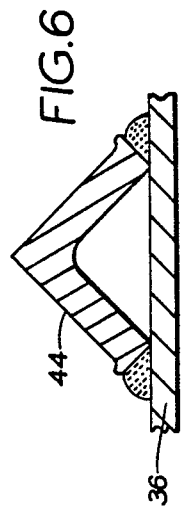
FIG. 3
FIG. 4
FIG. 5
FIG. 6

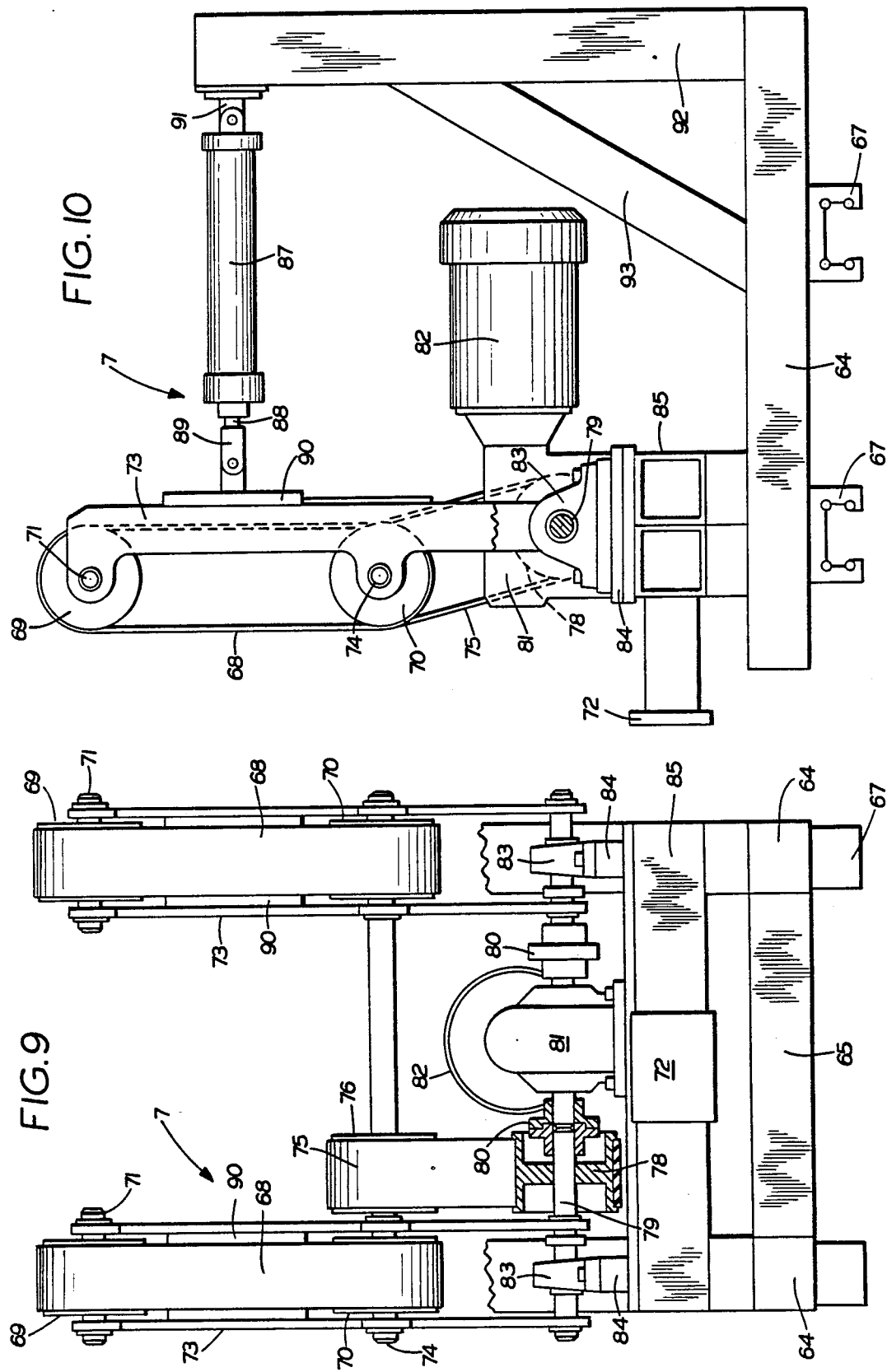

SERVER SYSTEM FOR RUBBERIZED SHEETS

TECHNICAL FIELD

The invention relates to a system for feeding sheet material to an assembly station from a supply roll of stock material consisting of the sheet material and an intervening liner. More particularly, the invention relates to a system for feeding rubberized sheets of material accurately to a building drum of an air spring manufacturing operation by controlling both the longitudinal position of the sheet with respect to the drum and the length of the sheet. This is accomplished in a mechanically simplified machine which has only one stock drive mechanism and no free loops.

BACKGROUND OF THE INVENTION

In the manufacture of various articles by use of sheet material, and in particular in the manufacture of air springs, rubberized sheet is delivered to a building drum or assembly station by various server mechanisms and systems. The majority of these stock servers as they are referred to in the industry, are deficient in that they do not compensate for stock skew and misalignment. Cutting positions are generally determined by the operator's visual reference and similar means for marking the approximate position where a manual cut is made by the operator. Dancer bars or free loops are techniques used to supply the rubberized sheet to the operator who manually pulls an estimated amount of rubberized sheet onto the building drum from the stock supply, during which, the server system automatically advances the rubberized sheet for subsequent use by the operator.

Although these prior servers are satisfactory for most applications, it is desirable to provide a server system enabling greater accuracy in delivery of sheet material to the operator to eliminate guess work on behalf of the operator in providing the correct length of sheet material to be used for placement on the drum, table or other assembly device. Furthermore, it is desirable to automate various parts of the manufacturing procedure to reduce installer error and to provide increased speed and efficiency in the manufacture of the air spring or other articles.

It is also a problem with existing servers to provide correct alignment to ensure that the delivered stock, especially at higher delivery rates, is properly aligned for subsequent cutting and placement at the assembly station. Heretofore, most prior art alignment systems required complicated positioning rolls and edge detection devices which physically contacted the moving strip, usually the longitudinal edge thereof. These edge detecting mechanisms occupy valuable space adjacent to the building drum and increase the cost of the server system and can distort the rubberized sheet due to the necessary guiding for correct positioning of the strip.

Another problem with prior art server systems, especially of the type wherein the liner is used as a control parameter, is that the linear speed of the liner, and consequently the stock material delivered from the supply roll, will vary if the control is based upon the speed of the take-up reel. The linear speed of the liner constantly changes due to the changing diameter of the take-up reel as it accumulates the stock liner thereon.

The most pertinent known examples of prior art server systems are disclosed in the following patents discussed below.

U.S. Pat. No. 1,959,418 discloses a winder for sheet material which includes an endless belt guided around rollers. A belt conveyor is provided for feeding strips of the material, and a plurality of bands are provided between adjacent knives.

U.S. Pat. No. 2,480,704 discloses a server for tire building machines in which a drum and fabric supply device is mounted rearwardly of the tire building drum. The server includes a frame having a base in a vertical standard, and arms are adapted to receive liner reels. The reels are positioned directly over rollers and are supported on the rollers by gravity. The liner wind-up reels are frictionally driven at a peripheral speed equal to that of the fabric in order to uniformly wind the liners. The apparatus is provided with means for automatically stopping the driving after a predetermined amount of fabric has been fed from rolls.

U.S. Pat. No. 2,755,028 discloses an apparatus for handling tire-ply material after manufacture and prior to assembly. The apparatus includes a pair of reels, each of which has a substantial length of liner stored thereon. At the end of the loading operation one of the reels will hold a liner with ply-stock interleaved therewith. The reels are rotatably driven by friction drive means and when the liner diameter on each of the take-up reels reaches a desired maximum size, a limit switch is actuated to stop the driving motor.

U.S. Pat. No. 3,293,101 discloses a tire fabric transfer mechanism which includes a photocell tracking unit which actuates a piston/cylinder assembly. The photocell unit maintains alignment of the edge of the stock material being delivered. The liner is removed from the stock roll at the same rate as the fabric is removed from the roll. Rolls of stock and liner material are mounted within receptacles and delivered into position when necessary.

U.S. Pat. No. 3,623,677 discloses an apparatus for automatically delivering successive lengths of ply-forming material from supply rolls to a tire building drum. The leading edges of the material are positioned at a predetermined proximity to the drum in an automatic fashion. The tire server includes a driving assembly with an electric motor to unwind the stock from the supply roll. A photocell unit is mounted on the frame and upon a "free-loop" reaching a maximum downward extent it will intercept a light beam to deenergize the feed mechanism to maintain a predetermined amount of material in the free loop.

U.S. Pat. No. 4,457,802 discloses an apparatus for conveying and shaping rubber sheet material which includes a pair of serving mechanisms. Rubber sheet is provided in a stock roll with an intervening liner and is driven by a motor in accordance with the amount of rubber material accumulating in a festoon portion of a "free loop" of stock material.

U.S. Pat. No. 4,540,131 discloses a roll sheet delivery and transfer mechanism in which a liner windup roller is driven by a touch roller which is in contact with the outer surface of the liner windup roller. In this mechanism the sheet material is delivered from the rolled sheet together with the liner and when the front of the sheet material arrives at a terminal end of the conveyor it is transferred to a feed conveyor by a push-down roller which is actuated by a photoelectric detection device.

Russian Pat. No. 897574 discloses a supply and application machine for rubber tread section blank which includes a transporting apparatus and a drive mechanism for moving a transporter towards the assembly drum. The apparatus also includes a length checking mechanism to determine the position of the rear edge of the blank to determine whether any cutting is required.

However, none of these prior art patents discloses the use of spaced timing belts for hugging and driving the liner onto a takeup reel to maintain the liner moving at a controlled and measureable liner speed by eliminating the formation of a free loop in the sheet material for accurately regulating the length of sheet material being delivered to a work station, or discloses the use of a camera with feedback to a motor controller, which subsequently commands the server drive to make any required adjustment of the stock material edge position.

SUMMARY OF THE INVENTION

Objectives of the invention include providing a server system for rubberized sheet material used particularly in the manufacture of air springs, which is provided with means for adequately compensating for skew or misalignment of successive portions of the sheet material to enable automation and more efficient delivery of the sheet material to the assembly station.

A further objective of the invention is to provide such a server system which has a stock server containing a prefilled cartridge of stock material and a take-up reel which is moved transversely into position adjacent a friction drive mechanism or "hugger device", which frictionally engages the liner material on the take-up reel to deliver the stock material at a predetermined and accurately controlled length for subsequent delivery to the assembly station.

Another objective of the invention is to provide such a server system in which an optical edge detection device is mounted at a remote distance from the moving stock material to detect the location of a longitudinal edge of the moving material, and supplies signals to a drive mechanism for moving the carriage containing the stock, reels and liner take-up reel, transversely with respect to the friction drive mechanism for adjusting and compensating for any misalignment; and in which the friction drive mechanism can be moved with the carriage to correct for any misalignment at the assembly station.

Still another objective of the invention is to provide such a server system in which an encoder senses the amount of stock material being moved toward the assembly station and supplies a signal in response thereto to the drive mechanism for the take-up reel friction drive, for controlling the delivery of stock material from the supply roll.

Another objective of the improved server system of the invention is to provide constant linear surface speed of the moving stock material by frictionally engaging the periphery of the take-up reel by linearly moving power-driven timing belts, thereby maintaining a constant surface speed of the stock material independent of the take-up reel diameter.

A still further objective of the invention is to provide an accurately controlled ballscrew drive mechanism for the transversely movable carriage, in which the ballnut is attached to the carriage with a unique coupler which allows movement of the ballnut in two planes perpendicular to the longitudinal axis of the ballscrew while allowing no freedom of movement along the axis of the ballscrew, thereby preventing any side loading on the ballscrew while providing extremely accurate movement of the ballnut along the ballscrew.

Still another objective of the invention is to provide such a server system in which the stock material is fed to the delivery station without the formation of any "free loop" or other stock in the rubberized sheet as heretofore incurred in prior art servers, enabling accurate movement and control of the amount of stock material fed to the assembly station; and in which the rubberized sheet is stripped from the liner and then subsequently redeposited on the liner for delivery by the liner to the building drum.

A further objective of the invention is to provide such a server system which requires a mechanism for controlling the gross motion of the carriage as well as the fine positioning thereof in order to locate the rubber stock or sheet material with respect to the assembly station, and for controlling the rotational speed of the liner take-up reel, and consequently the length of the liner material and stock material by controlling the motion profile of the timing belts frictionally engaged with the liner being collected on the take-up reel.

A still further objective of the invention is to provide such an improved server system which has a reduced number of components and controls therefor than in most prior art server systems, yet which enables a highly controlled movement and increased speed of rubberized sheet movement to an assembly station; and in which an automated mechanism such as a cutting system, can be employed for severing sections from the rubberized sheet delivered to the building drum for subsequent placement thereon.

These objectives and advantages of the invention are obtained by the improved server system of the invention, the general nature of which may be stated as including a system for feeding rubberized sheet to a building drum from a supply roll of stock material which includes an intervening liner and the rubberized sheet, wherein said system comprises a carriage assembly having a rotatably mounted liner take-up reel and a rotatably mounted supply roll of stock material and a plurality of rolls operative to strip said liner from the rubberized sheet and to deliver said sheet to the building drum on the liner after stripping the rubberized sheet from the liner, and to deliver the liner to said take-up reel; and drive means frictionally engaged with the liner at the take-up reel for delivering stock material from the supply roll at a controlled rate and length for delivering the rubberized sheet to the building drum on the liner after being stripped therefrom by maintaining tension on the liner and eliminating the formation of a free loop in the rubberized sheet.

BRIEF DESCRIPTION OF THE DRAWINGS

A preferred embodiment of the invention, illustrative of the best mode in which applicants have contemplated applying the principles, is set forth in the following description and is shown in the drawings and is set forth in the appended claims.

FIG. 3 is a top plan view of the frame of the carriage assembly of the improved server system;

FIG. 4 is a side elevational view of the frame of FIG. 3.

FIG. 5 is an enlarged fragmentary sectional view taken on Line 5—5, FIG. 3;

FIG. 6 is an enlarged fragmentary sectional view showing the vee rail of the frame of FIGS. 3 and 4;

FIG. 9 is an end elevational view with portions in section, of the "hugger drive" device of the improved server system;

FIG. 10 is a side elevational view with portions broken away, of the "hugger drive" of FIG. 9;

Similar numerals refer to similar parts throughout the drawings.

DESCRIPTION OF THE PREFERRED EMBODIMENTS

Figure 1:
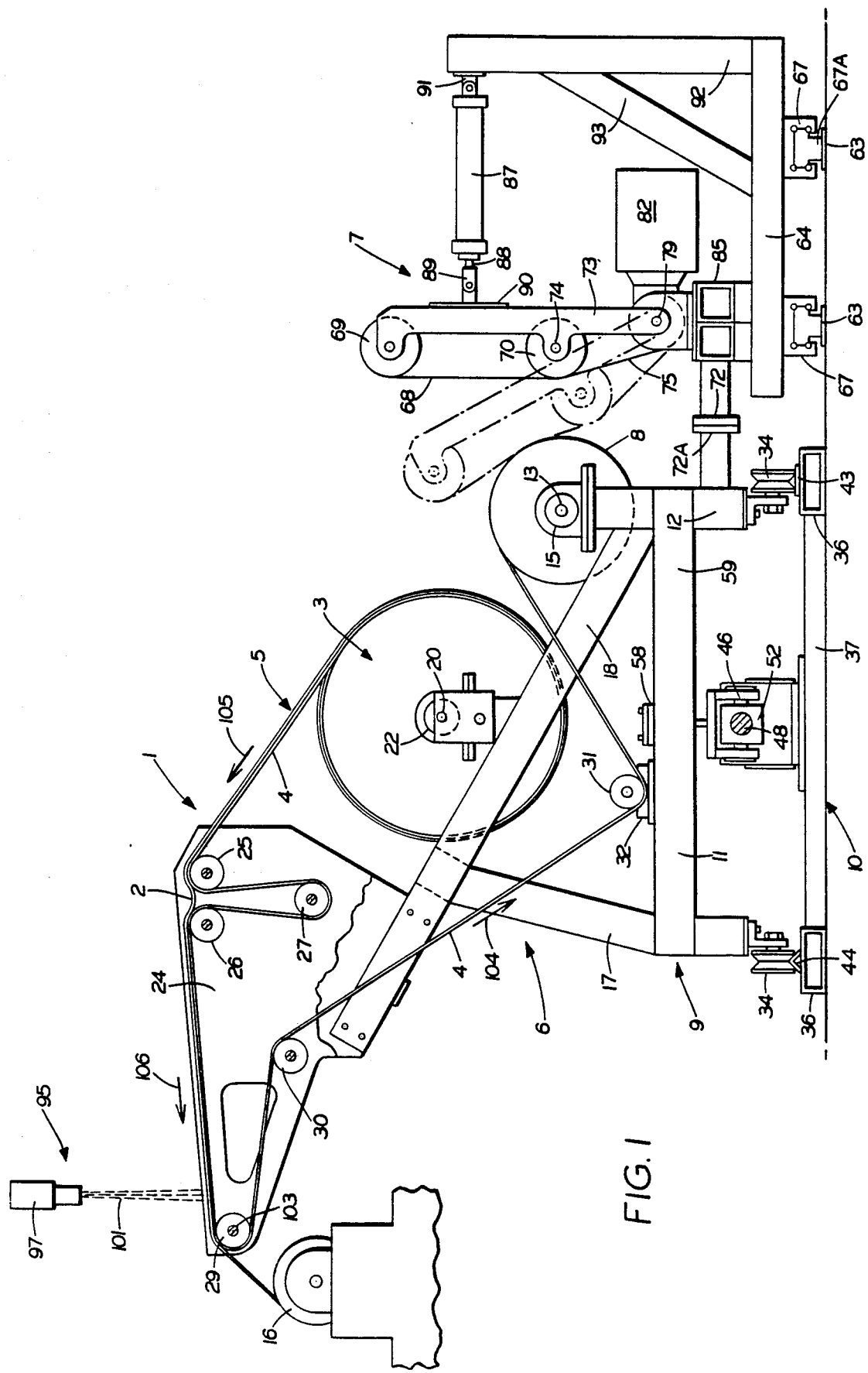
FIG. 1 is a generally diagrammatic side elevational view showing the main components of the server system with the rubberized sheet being delivered to a build-up drum and with the hugger drive mechanism being shown in a take-up reel engaged position in phantom lines and in a retracted position in full lines.

The improved server system of the invention is indicated generally at 1, and is shown particularly in FIG. 1, and delivers a rubberized sheet 2 from a prefilled stock roll 3 to a building drum 16 at an assembly station. If desired drum 16 can be replaced with a table, conveyor or other apparatus at the assembly station without effecting the concept of the invention. Stock roll 3 contains stock material which comprises a liner 4 which is interleaved between the coiled layers of rubberized sheet 2. Server system 1 includes as its main components a carriage assembly and a hugger drive assembly indicated generally at 6 and 7, respectively.

Figure 7:
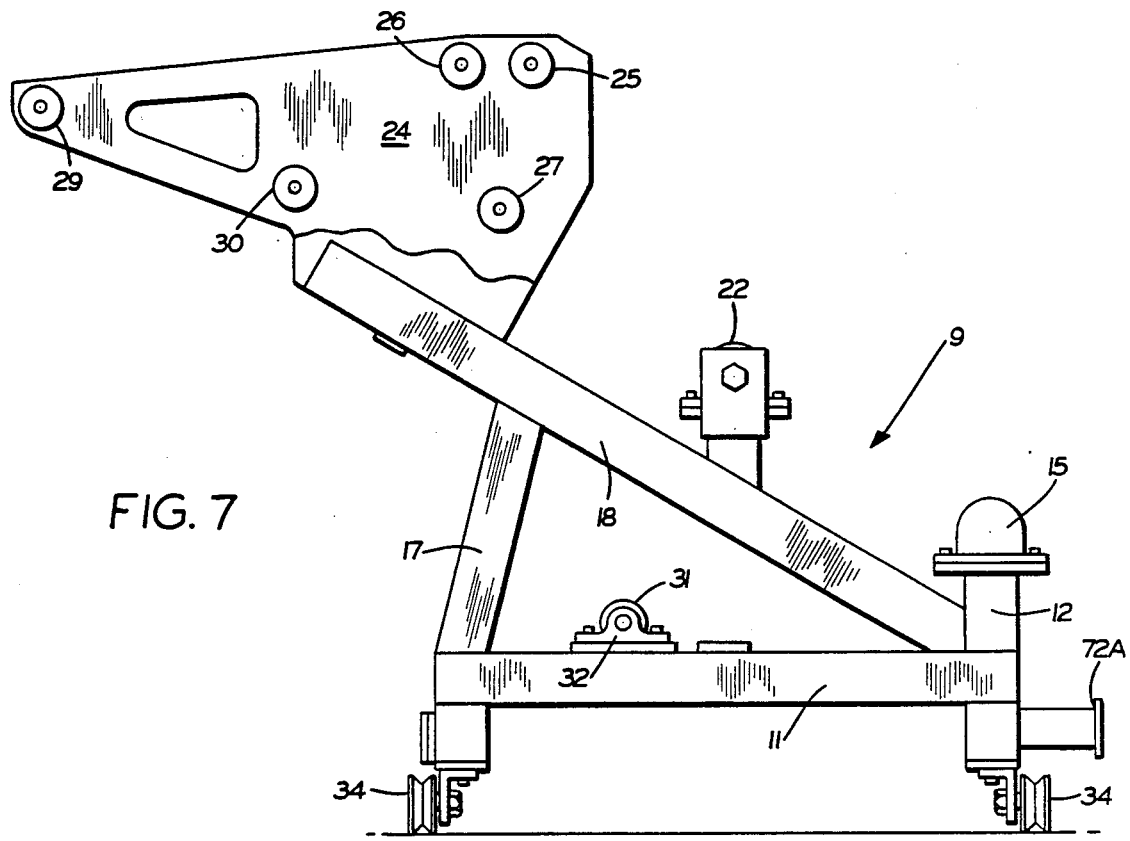
FIG. 7 is a side elevational view with portions broken away, of the carriage portion of the improved server system.
Figure 8:
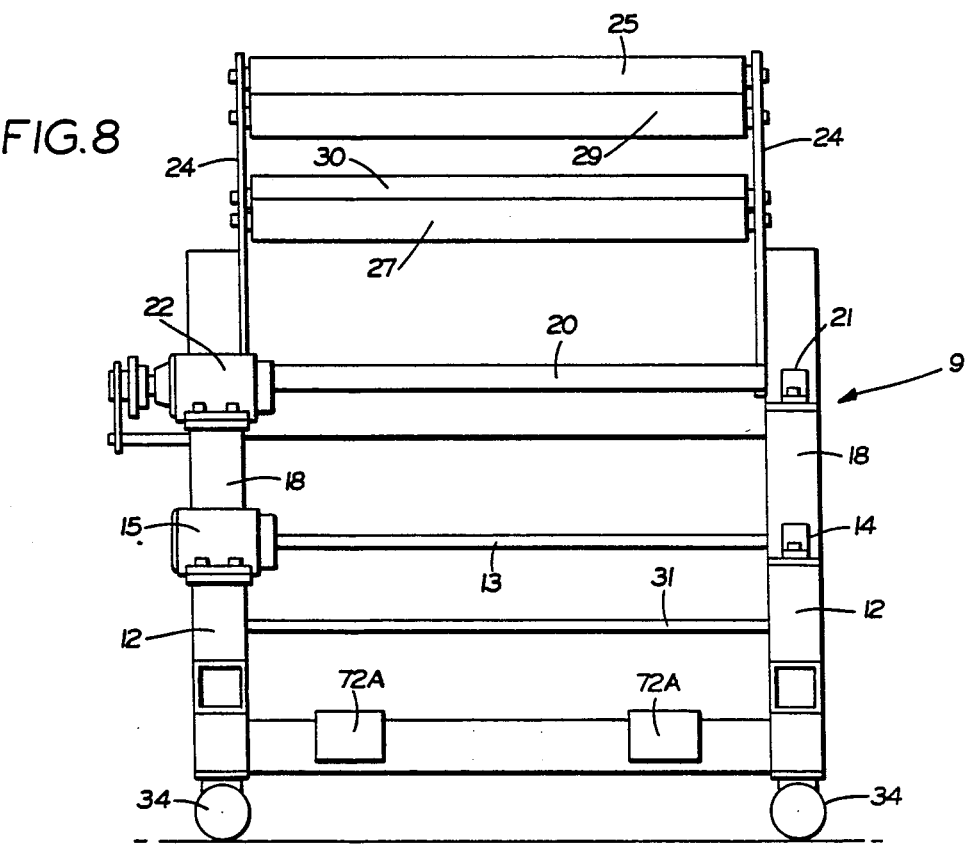
FIG. 8 is a generally diagrammatic end elevational view of the carriage of FIG. 7.

Carriage assembly 6 includes as its main components a carriage indicated generally at 9 (FIGS. 7 and 8), which is moveably mounted on a support frame indicated generally at 10 (FIGS. 3-6). Carriage 9 is formed by a plurality of horizontally extending cross-beams 11, and a pair of spaced parallel vertical support columns 12 on which is mounted a shaft 13 by a pair of spaced bearings 14 and 15. Shaft 13 rotatably supports a liner take-up reel 8 for winding liner 4 thereon after rubberized sheet 2 has been stripped therefrom as described in detail below.

Carriage 9 further includes a pair of spaced generally vertically extending beams 17 which are connected to rear support columns 12 by a pair of diagonally extending reinforcing beams 18. A second shaft 20 is rotatably mounted on beams 18 by a pair of end bearings 21 and 22 with bearing 22 having incorporated therein a one-way clutch mechanism (not shown) to prevent back-off of stock material 5 from prefilled stock roll 3 which is mounted on shaft 20. Shaft 20 extends horizontally with and is parallel with take-up reel shaft 13.

A pair of spaced parallel stripper plates 24 is mounted on the extended ends of beams 18 (FIGS. 1 and 7-8) and has a pair of stripper rolls 25 and 26 mounted in a horizontal spaced relationship on an upper portion thereof. Rolls 25 and 26 are spaced above a lower roll 27 about which liner 4 moves as the rubberized sheet 2 is being stripped from liner 4 by stripper roll 25. Two additional liner guide rolls 29 and 30 are mounted on and extend between stripper plates 24 for moving and guiding the liner material between the prefilled stock roll 3 and a liner take-up reel 8. Another liner guide roll 31 is rotatably mounted on a horizontal cross-beam 11 by bearings 32 for changing the direction of the liner as it is moving onto take-up reel 8.

In accordance with one of the features of the invention, all of the liner guide rolls, stripper rolls, stock material, and take-up reel shafts are freely rotatably mounted without any type of power drive means. This eliminates the need of supplying electric power to drive motors or other power-drive mechanisms as in prior art carriage constructions containing stock material, stock rolls and liner take-up reels.

Spaced pairs of V-grooved wheels 34 are mounted on the bottom of carriage 9 for movement of the carriage along support frame 10 as described below. Frame 10 (FIGS. 3-6) includes a pair of spaced horizontal frame members 36 and a plurality of horizontal connecting frame members 37, 38, 39, 40, 41, and 42. A flat rail 43 is mounted on and extends along one of the frame members 36 with a vee rail 44 being mounted on the other frame member 36. Rails 43 and 44 engage respective pairs of V-grooved wheels 34 of carriage 9 for moving the carriage along the frame member (FIG. 1).

A drive mechanism indicated generally at 45, is mounted on frame 10 and is operatively drivingly connected to carriage 9 by a coupler mechanism indicated generally at 46. Drive mechanism 45 includes a servo drive motor 47, the output of which rotates a ballscrew 48 which is supported in spaced bearings 49 and 50 mounted on cross members 38 and 40, respectively. Coupler mechanism 46 (FIGS. 11 and 12) includes a ballnut 52 which is mounted by a trunnion 53 containing a pair of bronze sleeves 54 that are located within openings 55 formed in spaced plates 56. Plates 56 extend downwardly from a horizontal plate 51 and together form a U-shaped support member indicated generally at 57. Member 57 may be secured to the bottom of a horizontal plate 58 extending between a pair of tubular shaped beams 59 which form a part of carriage 9 or by other attachment means.

Figure 11:
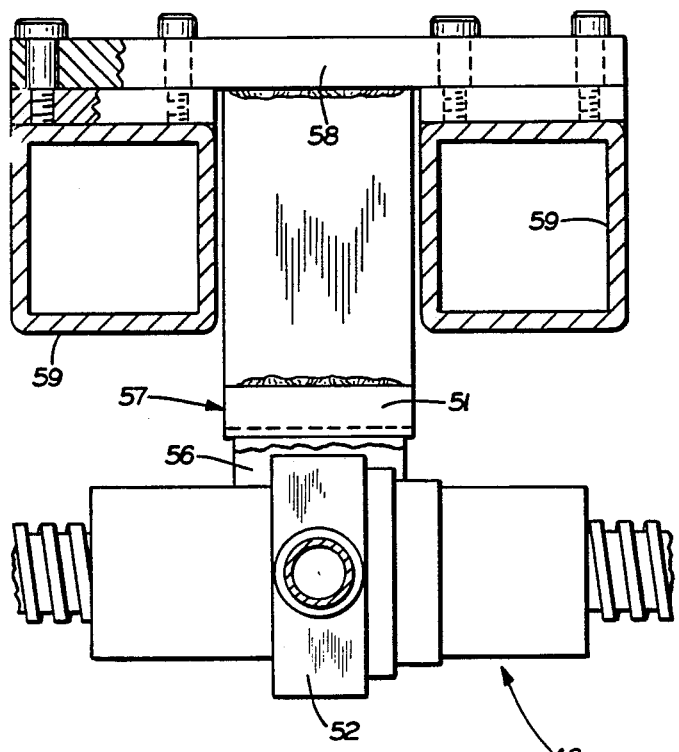
FIG. 11 is an enlarged fragmentary view with portions broken away and in section, of the improved coupler connecting the carriage assembly drive mechanism with the carriage.
Figure 12:
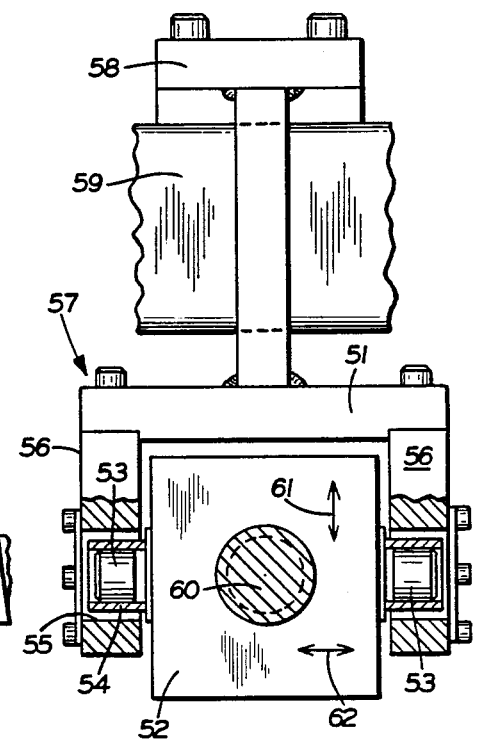
FIG. 12 is a fragmentary end elevational view with portions broken away and in section, of the coupler shown in FIG. 11.

The particular mounting of ballnut 52 in trunnion 53 as shown in FIG. 11, enables freedom of movement of the carriage in a pair of planes perpendicular to longitudinal axis 60 of ballscrew 48 indicated by arrows 61 and 62, while preventing any freedom of movement along axis 60. This arrangement prevents any side loading on the ballscrew and ballnut while providing extremely accurate movement of the ballnut along the ballscrew to ensure accurate control of the linear movement of the rubberized sheet and liner described in greater detail below. Thus, rotation of ballscrew 48 upon actuation of servo motor 47 will move carriage 9 along support frame 10 by the engagement of V-grooved wheels 34 on track rails 43 and 44.

Figure 2:
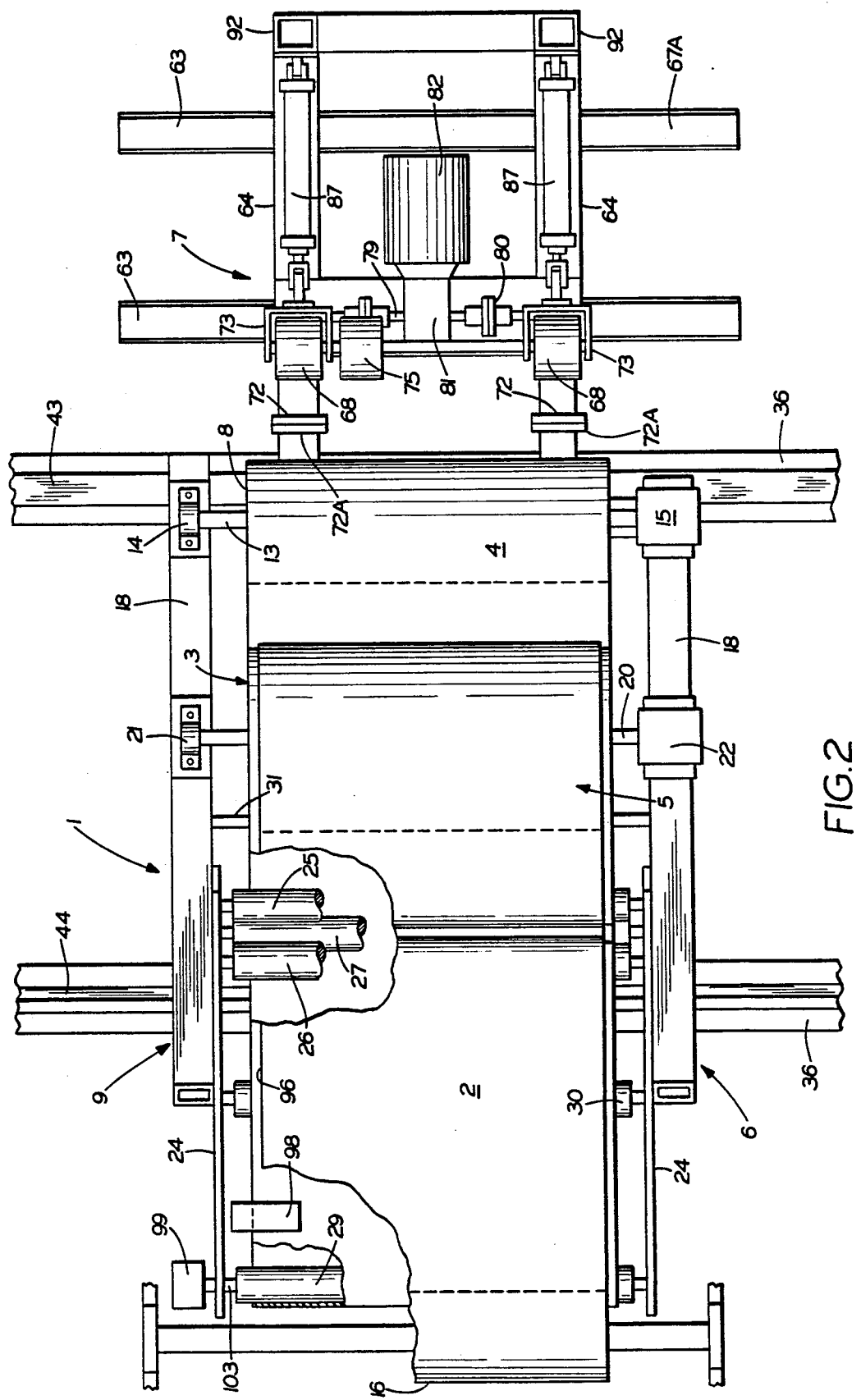
FIG. 2 is a fragmentary top plan view of the improved server system of FIG. 1, with portions broken away and in section.

Hugger drive assembly 7 is shown particularly in FIGS. 9 and 10, and includes a plurality of spaced horizontal support frame members 64 and tubular-shaped cross frame members 65 which form a rigid base. Assembly 7 preferably is moveably mounted on a pair of spaced rails 63 (FIGS. 1, 2 and 16) by a pair of linear bearings 67 and bearing ways 67A. Bearings 67 are mounted on the bottom of frame members 64 and ways 67A are mounted on rails 63. Assembly 7 may be driven along rails 63 independently of the movement of carriage 9 by usual drive means or may be removably coupled to carriage 9 by a pair of magnetic coupling plates 72 and 72A or other coupling means. These coupler plates enable carriage 9 to be selectively coupled to hugger drive assembly 7 so that assembly 7 can move transversely with the longitudinally moving stock material to correct for any transverse misalignment at the assembly station as described in greater detail below.

A pair of spaced timing belts 68 extend about a pair of spaced pulleys 69 and 70 which are mounted on individual shafts 71 extending between a pair of spaced mounting plates 73. Pulleys 70 are mounted on a common shaft 74 which is power driven by a timing belt 75 and associated pulley 76 which is mounted on shaft 74. Drive belt 75 extends about another pulley 78 which is mounted on a drive shaft 79 which is connected by a coupler 80 to the output of a gear reducer 81. Reducer 81 is connected to the output shaft of a servo drive motor 82. Drive shaft 79 is rotatably supported in spaced bearings 83 which are mounted on support pedestals 84 on a crossbeams 85.

Spaced mounting plates 73 for timing belts 68 are pivotally supported on the outer ends of drive shaft 79 and are pivotally moved by a pair of pressure actuated, preferably pneumatic cylinders 87 (FIG. 10). Piston rods 88 of cylinders 87 are connected by clevises 89 to a plate 90 which extends across and between the individual spaced mounting plates 73 for each of the timing belts 68. The other ends of cylinders 87 are pivotally mounted by clevises 91 to the upper ends of a pair of vertical columns 92 preferably formed out of square tubing as are frame members 64 and 65. Columns 92 preferably are reinforced by diagonally extending square tubular members 93 which are also connected to associated horizontal base frame members 64.

Figure 13A:
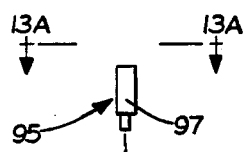
FIG. 13A is an enlarged fragmentary plan view looking in the direction of arrows 13A—13A, FIG. 13.

In accordance with another feature of the invention, an optical edge detection mechanism indicated generally at 95 (FIGS. 1, 13 and 13A), is mounted above an edge 96 of rubberized sheet 2. Mechanism 95 preferably includes a single dimensional camera of the type manufactured by Honeywell Visitronic Operations of Inglewood, Colo. identified as a model no. HVS-200. Other types of cameras, preferably single dimensional in operation, could be used satisfactorily without effecting the concept of the invention. Beam 101 of the camera is directed toward longitudinal edge 96 of sheet 2 and reflects off a highly reflective plate 98 which is mounted on the carriage assembly frame and extends beneath edge 96 as shown particularly in FIGS. 2 and 13A. Plate 98 provides for accurate contrast between rubberized sheet 2 to enable the camera to accurately determine the position of edge 96 and provide the appropriate feedback signals as described below, for controlling the lateral or transverse position of rubberized sheet 2 as it moves linearly, longitudinally from stock roll 3 toward building drum 16 or as carriage 9 is being brought into position with drum 16 at the start of another dispense cycle as described below. A rotary encoder 99 preferably is mounted on the outer end of shaft 103 of liner roll 29.

Figure 13:
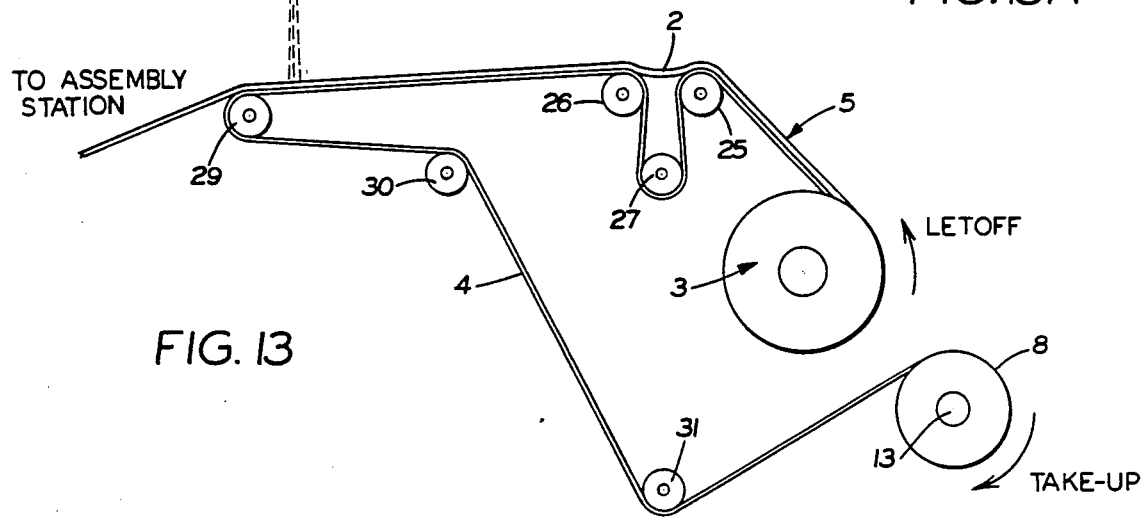
FIG. 13 is a diagrammatic view showing the movement of the stock material and liner between the supply reel and liner take-up reel.

The operation of improved server system 1 is best illustrated in FIGS. 1 and 13. Prefilled stock roll 3 of stock material 5 consisting of rubberized sheet 2 and intervening liner 4, is rotatably supported on shaft 13 and is moved transversely along support frame 10 on carriage 9 together with liner take-up reel 8. Carriage assembly 6 is moved into position by actuation of servo drive motor 47 and ballscrew 48. Upon reaching the desired position, pressure cylinders 87 of hugger drive assembly 7 are actuated pivotally moving timing belts 68 into engagement with take-up reel 8 if empty, or with the topmost convolution of liner 4 wound thereabout. The timing belts wrap partially about a short arcuate distance of the collected liner to provide sufficient driving frictional engagement therewith as illustrated in dot-dash lines FIG. 1.

Figure 15:
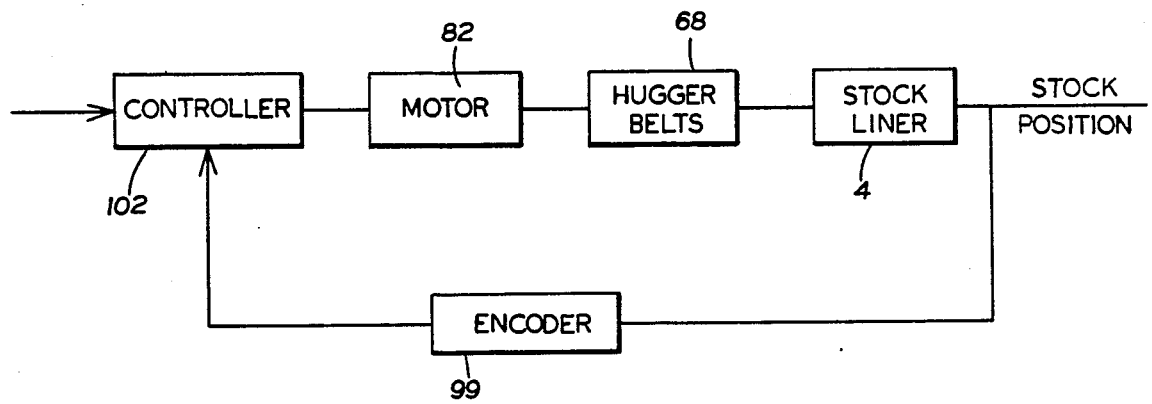
FIG. 15 is a block diagram of the control system for controlling the linear movement of the stock material from the supply roll.

A usual motion controller 102 is operatively connected to carriage drive motor 47 and hugger drive motor 82 for controlling the operation thereof in response to feedbacks provided particularly by rotary encoder 99 and edge detection mechanism 95. At the start of a dispense operation, hugger drive motor 82 is energized and rotates belts 68 at a predetermined linear speed, which in turn will rotate take-up reel 8 at the same linear speed moving liner 4 in the longitudinal direction of arrow 104 (FIG. 1). This movement of liner 4 will advance stock material 5 in the direction of arrow 105 from stock roll 3 with rubberized sheet 2 being stripped from liner 4 by stripper rollers 25, 26, and 27. The liner which is moving at a constant linear speed re-engages rubberized sheet 2 at stripper roll 26 carrying it forwardly in the direction of arrow 106 toward building drum 16. Rotary encoder 99 will provide a series of pulses in direct relationship to the linear movement and length of rubberized sheet 2 since its movement will rotate roll 29 and shaft 103. These pulses are fed to the motion controller, which after a predetermined number of pulses, the number of which will accurately determine the linear length of rubberized sheet being fed toward building drum 16, will de-energize gripper drive motor 82 stopping the linear movement of stock material 5 (FIG. 15). An automated cutting mechanism (not shown) which may be mounted adjacent the discharge end of the carriage assembly adjacent roll 29, will sever rubberized sheet 2 at the predetermined location in a usual manner, whereupon the severed sheet can be wound about building drum 16. If desired the rubberized sheet may be manually cut at a premarked position ensuring that the desired linear length of sheet 2 has been delivered to drum 16. This accurately controlled linear movement and length of sheet 2 eliminates any guesswork by the operator if manually cut, and if used with an automated cutting knife, ensures that the correct length of the sheet material has been cut from the continuous strip and deposited on building drum 16.

Figure 14:
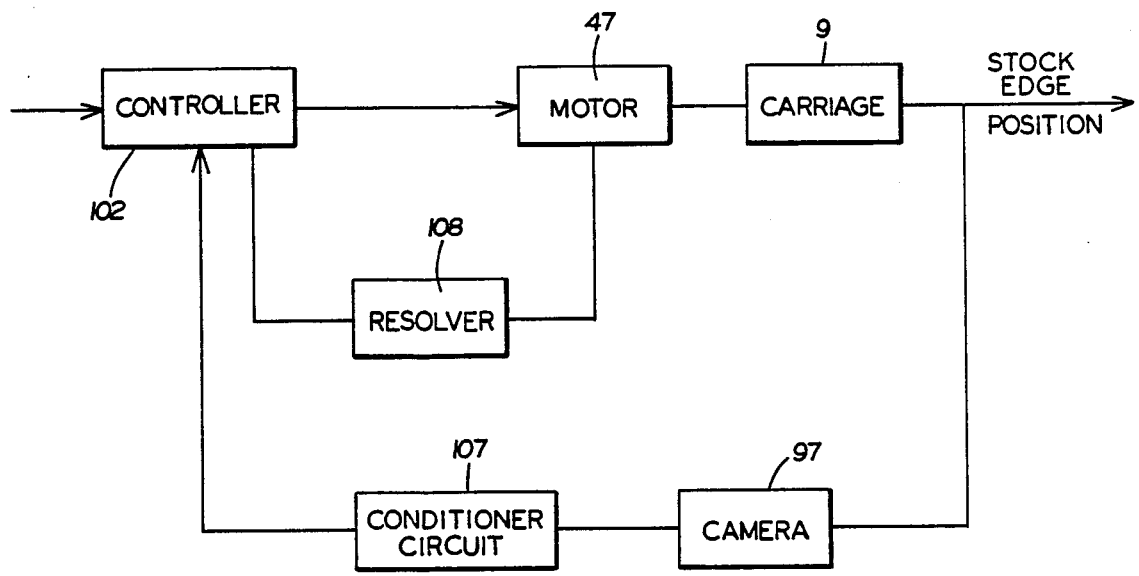
FIG. 14 is a block diagram of the control system for maintaining alignment of the edge of the stock material.

In further accordance with another feature of the invention, camera 97 permits continuous monitoring of the location of edge 96 of rubberized sheet 2 as shown particularly in FIGS. 1, 13 and 14. In the event that edge 96 moves laterally from its desired location, such movement will be sensed by edge detection mechanism 95 and the appropriate signal fed to the motion controller. The controller will energize servo drive motor 47 which will move carriage 9 through ballscrew 48, along support frame 10 to correct for any such edge misalignment immediately prior to stock delivery to the assembly station. Thus, carriage assembly 6 is movable transversely with respect to the longitudinal discharge movement of stock material 5 for bringing a prefilled stock roll 3 into position and for removing a empty cartridge and filled liner take-up reel 8 therefrom. In addition, this transverse movement of carriage 9 corrects for any misalignment of the moving rubberized sheet 2 as it moves towards drum 16.

This transverse adjustment of sheet 2 also can be performed while the stock material 5 is being fed toward drum 16 by coupling hugger drive assembly 7 to carriage 9 by coupling plates 72 and 72A. This provides continuous monitoring and dynamic adjustment of the moving stock material without any contact with the moving strip by the detection or adjustment means thereby preventing distortion in the material as caused by prior art detecting devices. Also location of the edge detection means adjacent the discharge location of the rubberized sheet and building drum in contrast to downstream edge detection devices of the prior art, enhances the accuracy of the delivered material.

This edge detection is accomplished without any contact with the moving strip edge as heretofore required in many server systems, and enables the camera or optical edge detection mechanism to be positioned vertically above rubberized sheet 2 adjacent to the discharge end of the carriage assembly, where it is out of the way of the carriage movement and of other equipment in the building area. It furthermore provides a high degree of accuracy able to detect extreme minor off-center movements of the longitudinal strip edge which can be adjusted for automatically by rotation of ballscrew 48 in the appropriate direction.

The particular edge control feature is shown in block diagram form in FIG. 14 in which camera 97 supplies a signal which is conditioned by a conditioner circuit 107 to controller 102. The controller then supplies appropriate control signals to motor 47 which in turn controls the transverse movement of carriage 9. A resolver 108 preferably is incorporated into the circuiting to provide speed feedback from motor 47 to controller 102 for speed control of the motor.

The particular linear movement and control of stock material 5 is shown in block diagram form in FIG. 15. Encoder 99 supplies appropriate control signals to controller 102 which in turn energizes hugger motor 82 and engages hugger drive belts with take-up reel 8 for controlled linear movement of liner 4 for moving of the exact linear length of rubberized sheet toward building drum 16. As shown in FIG. 1, the controlled linear movement and length of liner 4 by the linear movement of timing belts 68 is uneffected by the continuous increase in the diameter of take-up reel 8. Thus the frictional engagement of hugger drive assembly 7 with liner 4 provides for the controlled delivering of the desired length of rubberized sheet 2 to building drum 16 by the linear movement of liner 4 in relationship to the direct amount of linear movement of timing belts 68 without the formation of a "free loop" or other slack in the rubberized sheet or stock material as in prior art server systems.

As clearly shown in FIG. 1, this accurately controlled movement of the rubberized sheet is possible since the heretofore used "free loop" or dancer bars in either the rubberized sheet 2 or stock material 5 has been completely eliminated since liner 4 is under tension at all times and rubberized sheet 2 is moved linearly in direct relationship to the movement of liner 4. This is accomplished by the pre-stripping of liner 4 from sheet 2 by rolls 25, 26, and 27 with liner 4 subsequently rejoining and carrying the previous stripped rubberized sheet from roller 26 to the discharge end of the carriage adjacent roll 29. When the hugger is retracted tension is maintained in the liner by the use of unidirectional bearings in take-up roll 15, FIG. 1.

Furthermore, the feedback signal from encoder 99 accurately determines the length of sheet material 2 being moved linearly along the server on liner 4 which is fed to the motion controller for controlling hugger drive motor 82. Also, the feedback provided by camera 97 which is fed to the controller and then to ballscrew drive motor 47 for transverse adjustment of the carriage assembly, ensures that the predetermined accurately controlled length of rubberized sheet 2 is properly aligned in the transverse direction for subsequent deposit onto building drum 16 eliminating any subsequent, manual or automated adjustment thereof. Usually only hugger drive motor 82 is required to both linearly move and separate rubberized sheet 2 from liner 4 and to control the desired longitudinal length thereof which is delivered to a cutting station located adjacent roll 29. However, for an even more accurately controlled linear movement of the rubberized sheet, encoder 99 is utilized. Use of encoder 99 will eliminate any error arising due to stretching of liner 4 in moving from roll 29 to take-up reel 8.

Another advantage of the improved server system is the use of the optical edge detection system, which preferably is single dimensional camera 97, which is free of physical contact with longitudinal edge 96 of rubberized sheet 2 for correctly positioning the rubberized sheet in the transverse direction by actuation of ballscrew motor 47 which is mounted on stationary carriage support frame 10. Since motors 47 and 82 are both mounted on stationary members as well as controller 102, no electrical, pneumatic or hydraulic components are required on moveable carriage assembly 6 thereby eliminating movement of associated wires and other controls which increases the simplicity of the improved server system.

Figure 16:
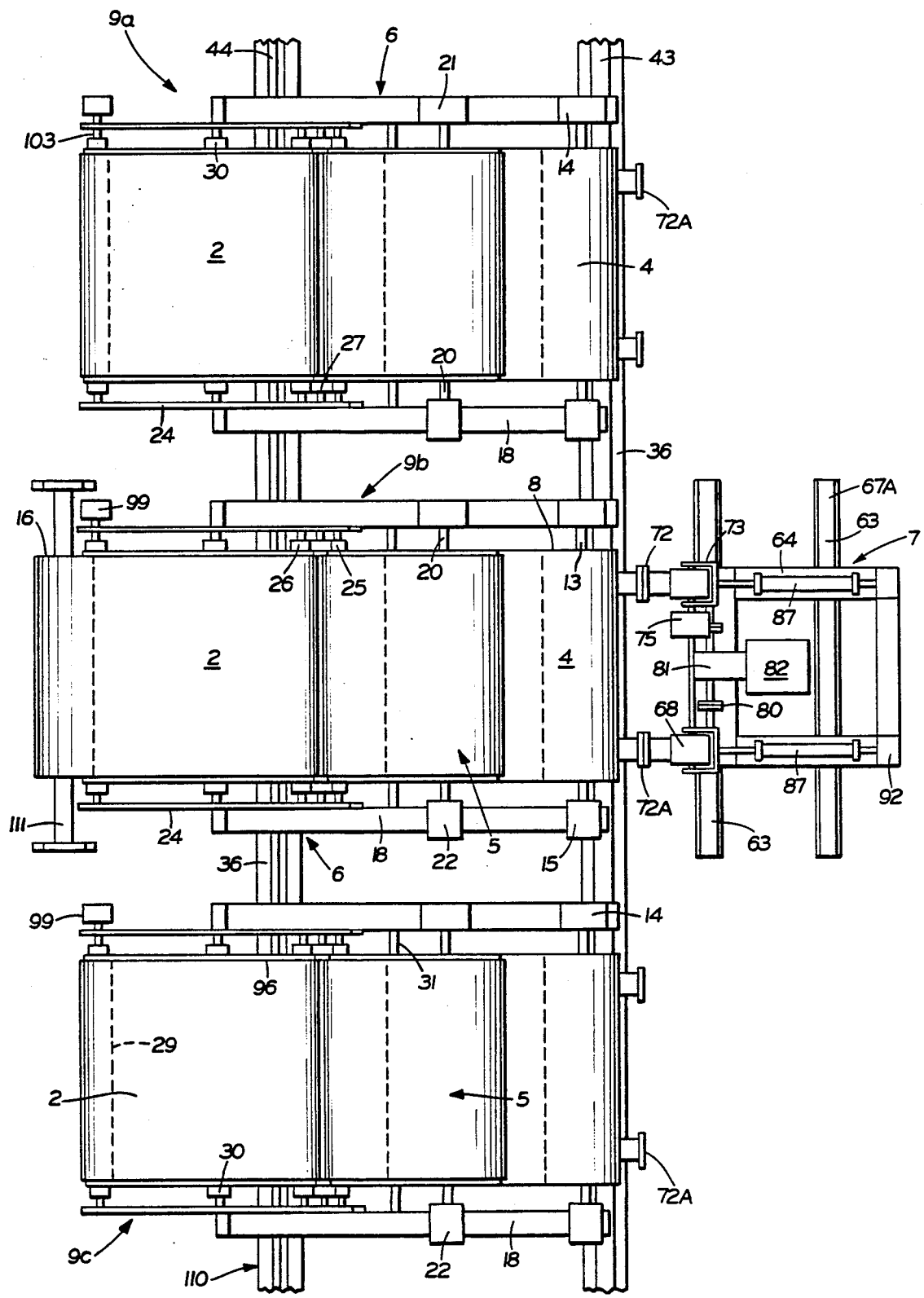
FIG. 16 is a diagrammatic top plan view of three of the carriages moveably mounted on the frame in combination with a single "hugger drive" for delivery of the stock material to an assembly station.

Another example in which the improved server system can be utilized is shown in FIG. 16 in which three carriages 9 are coupled together by their engagement with ballscrew 48 and are movable in unison along the rails 43 and 44 of a frame member 110 which is similar to frame member 10 described above. The three individual carriages 9 each contain a stock roll 3 and take-up reel 8 as described above. Carriages 9 are individually selectively coupled by magnetic plates 72A to plates 72 of hugger drive assembly 7 for delivering a predetermined length of the particular stock material contained in stock roll 3 to build-up drum 16. Drum 16 may be rotatably mounted on a mandrel 111 for progressively building an air spring or other article utilizing three strips of material applied in successive layers on the build-up drum.

For example, the carriages which are individually indicated at 9A, 9B and 9C, each will contain a different rubberized sheet on its stock roll 3 for successive delivery to drum 16. The individual carriages are moved into position adjacent hugger drive 7, their location being accurately determined by edge detection mechanism 95 and servo-drive motor 47 as described above. Once in position the particular carriage is coupled to hugger drive assembly 7 through the magnetic coupling plates or other coupling means, and the desired length of strip material is delivered to drum 16. After this dispense cycle the carriages are then moved in unison along frame member 110 after being uncoupled from hugger drive assembly 7 until the next carriage, for example, carriage 9C is aligned with hugger 7, its position again being controlled by edge detection mechanism 95.

Thus the three different types of strip material are fed to building drum 16 automatically by individually moving each of the carriages into position between the drum and hugger drive, which position is controlled by edge detection mechanism 95. Also edge detection mechanism 95 is used for making any additional minor adjustments during delivering of the particular stock material contained on its stock roll 3 by the coordinated movement of the carriage and coupled hugger drive assembly 7 in the similar manner as described above. Therefore the required number of strips of material, each being accurately measured for a desired length, is delivered individually to the building drum. Again, the individual strips of material are accurately sized by maintaining tension on the liner which is used to carry the rubberized sheets to the building drum after being stripped therefrom by eliminating all slack in the liner and rubberized sheet and without the use of free loops or dancing bars.

Thus, improved server system 1 is extremely simplified and thereby less expensive to manufacture and operate, yet it provides a high degree of control and accuracy in discharging and feeding a strip of rubberized sheet or other sheet material to an assembly station. Although the above server system has been described with respect to rubberized sheet for a building drum, preferably for building air springs, it is easily seen to anyone skilled in the art that the system can be used for delivering other types of sheet materials to an assembly station.

Accordingly, the improved server system for rubberized sheets is simplified, provides an effective, safe, inexpensive, and efficient system which achieves all the enumerated objectives, provides for eliminating difficulties encountered with prior systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved server system for rubberized sheets is constructed and used, the characteristics of the construction, and the advantageous, new and useful results obtained; the new and useful structures, devices, elements, arrangements, parts, and combinations, are set forth in the appended claims.

What is claimed is:

1. A server system for feeding rubberized sheet to an assembly station from a supply roll of stock material which includes an intervening liner and the rubberized sheet; said system including;

(a) a carriage assembly including a rotatably mounted liner take-up reel and a rotatably mounted supply roll of stock material;

(b) roll means for operatively stripping said liner from the rubberized sheet as the liner moves from the supply roll to the take-up reel at a position upstream from the assembly station and for depositing said rubberized sheet back onto the liner downstream therefrom and for carrying said redeposited rubberized sheet to a discharge end adjacent the assembly station on the liner; and (c) drive means frictionally engaged with the liner at the take-up reel for maintaining tension on the liner as it moves from the supply roll to the take-up reel to remove stock material from the supply roll and deliver the rubberized sheet at a controlled rate and length to the discharge end on the liner by eliminating the formation of a free loop in the rubberized sheet as it is being carried by the liner to the discharge end.

2. The system defined in claim 1 in which the carriage assembly includes a carriage and a frame; in which the frame has guide tracks and a drive mechanism; and in which the carriage is movably mounted on the tracks for movement in a direction transverse to the longitudinal movement of the stock material and liner by the drive mechanism.

3. The system defined in claim 2 in which the carriage includes a pair of shafts mounted in a horizontally spaced relationship for rotatably supporting the supply roll of stock material and the take-up reel.

4. The system defined in claim 2 in which the carriage includes stripper plate means for mounting certain of the roll means thereon.

5. The system defined in claim 2 in which the drive mechanism includes a ballscrew and ballscrew nut, and a drive motor for rotating said ballscrew; and in which a coupler operatively connects the ballscrew nut to the carriage for movement of said carriage by the drive mechanism along the tracks.

6. The system defined in claim 5 in which the coupler includes a trunnion permitting freedom of movement of the carriage in a plane perpendicular to a longitudinal axis of the ballscrew while preventing any freedom of movement along said axis.

7. The system defined in claim 6 in which the trunnion is mounted in sleeve bearings located in a pair of spaced bracket legs connected to the carriage.

8. The system defined in claim 1 in which the drive means includes a plurality of timing belts adapted to frictionally engage the liner at the take-up reel, motor means for driving the timing belts at a constant speed independent of the diameter of the take-up reel and liner thereon, and means for moving the timing belts into and out of engagement with the liner.

9. The system defined in claim 2 including control means for positioning the carriage transversely with respect to the drive means and for controlling the drive means.

10. The system defined in claim 9 in which the control means includes detection means for detecting the transverse position of the rubberized sheet prior to delivery to the assembly station.

11. The system defined in claim 10 in which the detection means is an optical device which detects the longitudinal edge of the rubberized sheet.

12. The system defined in claim 9 in which the control means includes a rotary encoder operative in response to the linear movement of the rubberized sheet for determining the length of said sheet delivered from the supply roll.

13. The system defined in claim 12 in which the drive means is controlled by a motion controller; and in which the encoder supplies a control signal to the motion controller for use in regulating the motion profile of the drive means.

14. The system defined in claim 11 in which the optical device is a single dimensional camera mounted adjacent to and above the rubberized sheet as said sheet is being carried in a generally horizontal direction by the liner after being stripped from the liner by certain of the roll means.

15. The system defined in claim 9 in which the control means includes a detection device for determining the location of the longitudinal edge of the rubberized sheet after said sheet is stripped from the liner and for providing a signal to the carriage drive mechanism for positioning the carriage on the guide tracks to maintain alignment of the rubberized sheet.

16. A system for delivering sheet material to an assembly station from a supply roll of stock material containing the sheet material and an intervening liner; said system including:
   (a) drive means frictionally engaged with a portion of the liner wound about a liner take-up reel for delivering stock material from the supply roll at a controlled rate and length by maintaining tension on said liner;
   (b) stripper means for stripping the sheet material from the liner upstream of the assembly station; and
   (c) means for redepositing the stripped sheet material on the liner downstream of the stripper means and remote from the assembly station in response to continued movement of the liner toward the take-up reel by the drive means, said redeposited sheet material being without any free loop and without any tension thereon after being stripped from the stock material while being carried toward the assembly station by the liner.

17. The system defined in claim 16 including control means for regulating the length of stock material delivered from the supply roll by actuating the drive means.

18. The system defined in claim 16 including means for optically detecting the location of a longitudinal edge of the sheet material after being stripped from the liner; and carriage means for moving the sheet material transversely with respect to the longitudinal movement of the stock material to maintain alignment of the sheet material at the assembly station.

19. The system defined in claim 18 in which the carriage means includes a carriage and a frame; in which the frame has guide tracks and a drive mechanism; in which the supply roll and take-up reel are mounted on the carriage; and in which the carriage is movable along the tracks by the drive mechanism transversely with respect to the take-up reel drive means.

20. The system defined in claim 16 in which the drive means includes at least one timing belt frictionally driving the liner at the take-up reel; motor means for driving the timing belt at a controlled speed to maintain a predetermined tension on the liner to eliminate any free play in the stock material as it is delivered out from the supply roll and the rubberized sheet is being delivered to the assembly station; and means for moving the timing belt into and out of engagement with the liner at the take-up reel.

21. The system defined in claim 16 in which the stripper means includes at least three rolls with two of said rolls being located in a generally horizontal spaced relationship and the third roll located vertically below said two rolls; in which the liner extends about said three rolls and changes direction in moving about said three rolls with the sheet material continuing horizontally between said two rolls.

22. The system defined in claim 16 in which the sheet material is deposited onto the liner after being stripped therefrom, wherein said liner provides the means for moving said sheet material toward the assembly station at a controlled rate and length.

23. A server system for feeding rubberized sheet to an assembly station from a supply roll of stock material which includes an intervening liner and the rubberized sheet; said system including a carriage assembly including a rotatably mounted liner take-up reel and a rotatably mounted supply roll of stock material, and a plurality of rolls operative to strip said liner from the rubberized sheet and to deposit said rubberized sheet back on said liner to deliver said sheet to the assembly station on the liner and to deliver the liner to said take-up reel; said carriage assembly further including a carriage and a frame, with said frame having guide tracks and a drive mechanism, and with said carriage being movably mounted on the tracks for movement in a direction transverse to the longitudinal movement of the stock material and liner; and drive means for controlling the rotation of the liner take-up reel for delivering stock material from the supply roll at a controlled rate and length for carrying the rubberized sheet to the assembly station on the liner after being stripped from the liner, by maintaining tension on the liner and eliminating the formation of a free loop in the rubberized sheet.

24. A server system for successively delivering individualized strips of rubberized sheet to an assembly station from a plurality of supply rolls of stock material which includes an intervening liner and the rubberized sheet; said system including carriage means having the supply rolls rotatably mounted thereon in a spaced relationship, each of said supply rolls having a rotatable take-up reel associated therewith; stripper means for stripping the rubberized sheet material from the liner upstream of a discharge end of the carriage means as the stock material is moving longitudinally toward the assembly station; means located downstream of the stripper means for depositing the stripped rubberized sheet material back onto the liner; first drive means for selectively delivering stock material from one of the supply rolls at a controlled rate and length for delivering the deposited stripped rubberized sheet free of tension to the assembly station on the liner and preventing the formation of a free loop in said deposited sheet material by maintaining tension on the liner as it is being wound about the take-up reel; second drive means for moving the carriage means transversely with respect to the longitudinal direction for individually selectively positioning the supply rolls between the second drive means and the assembly station for subsequent delivery of a strip of rubberized sheet material to the assembly station; and control means for positioning the selected supply roll between the assembly station and the first drive means and for maintaining alignment of the stock material as the rubberized sheet is being delivered to the assembly station.

25. The server system defined in claim 24 in which the first drive means is moveably mounted for transverse movement parallel with the movement of the carriage means.

26. The server system defined in claim 25 including means for selectively coupling the first drive means to the second drive means.

27. The server system defined in claim 24 in which certain of the supply rolls contain a different stock material than contained on others of the supply rolls.

28. The server system defined in claim 24 in which the control means includes optical detection means for continuously monitoring a longitudinal edge of the stock material as it is moving longitudinally toward the assembly station; and in which said detection means supplies signals to the second drive means in response to the location of said longitudinal edge for transversely moving the carriage means to adjust the position of said stock material edge as it is moving toward the assembly station.

* * * * *